(12) United States Patent
Wang et al.

(10) Patent No.: US 11,791,641 B2
(45) Date of Patent: Oct. 17, 2023

(54) HIGH-VOLTAGE COMPONENT PROTECTION DURING VEHICLE RECHARGING

(71) Applicant: GM GLOBAL TECHNOLOGY OPERATIONS LLC, Detroit, MI (US)

(72) Inventors: Konking Wang, Canton, MI (US); Emil Francu, Northville, MI (US); Li-Pen J. Ho, Farmington Hills, MI (US); Kevin J. Robinet, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 17/528,727

(22) Filed: Nov. 17, 2021

(65) Prior Publication Data

US 2023/0155400 A1 May 18, 2023

(51) Int. Cl.
*H02J 7/00* (2006.01)
*H02J 7/14* (2006.01)
*B60L 50/64* (2019.01)

(52) U.S. Cl.
CPC .......... *H02J 7/00308* (2020.01); *B60L 50/64* (2019.02); *H02J 7/0024* (2013.01); *H02J 7/1423* (2013.01); *B60L 2240/547* (2013.01)

(58) Field of Classification Search
CPC .... H02J 7/00308; H02J 7/0024; H02J 7/1423; B60L 50/64; B60L 2240/547
USPC .......................................................... 320/134
See application file for complete search history.

(56) References Cited

U.S. PATENT DOCUMENTS

| | | | | |
|---|---|---|---|---|
| 8,330,420 B2 * | 12/2012 | Kim | ...................... | H02J 7/0016 320/120 |
| 8,737,031 B2 * | 5/2014 | Ohnuki | ................... | B60L 58/19 361/91.1 |
| 8,861,150 B2 * | 10/2014 | Shu | ....................... | B60L 3/0046 307/10.7 |
| 9,817,050 B2 * | 11/2017 | Weicker | ............ | G01R 31/3277 |
| 10,305,298 B2 * | 5/2019 | Kristensen | ............ | H02J 7/0024 |

(Continued)

FOREIGN PATENT DOCUMENTS

| | | | | |
|---|---|---|---|---|
| CA | 2486325 C | * | 2/2013 | ............ H02M 7/153 |
| CN | 111751746 A | * | 10/2020 | ....... G01R 19/16576 |

(Continued)

*Primary Examiner* — M Baye Diao
(74) *Attorney, Agent, or Firm* — Quinn IP Law

(57) ABSTRACT

A protection system for a high-voltage component includes a switching circuit and a protection controller. The switching circuit changes a variable arrangement of multiple battery packs between a parallel arrangement and a series arrangement. The protection controller commands the switching circuit into the series arrangement in response to a recharging session, commands a current flow in the recharging session, measures a measured voltage between an input node and a floating chassis ground of the high-voltage component, advances a timer while the measured voltage indicates a presence of an improper voltage, and cancels the recharging session in response to the presence of the improper voltage for greater than an exposure time. The recharging session provides a direct-current fast-charging voltage to battery packs in the series arrangement, and is greater than the battery voltage.

20 Claims, 8 Drawing Sheets

(56) References Cited

U.S. PATENT DOCUMENTS

| | | | |
|---|---|---|---|
| 11,296,525 B2* | 4/2022 | Li | H02J 7/0063 |
| 11,312,238 B2* | 4/2022 | Pennisi | H02J 7/00308 |
| 11,424,630 B1* | 8/2022 | Wiegman | B64D 27/24 |
| 11,444,469 B2* | 9/2022 | Nakayama | H02J 7/0047 |
| 11,658,370 B2* | 5/2023 | Hsiao | G01R 31/385 |
| | | | 320/116 |
| 2017/0028857 A1* | 2/2017 | Gonzales | B60L 53/00 |
| 2018/0041054 A1* | 2/2018 | Nakamoto | H02J 7/1492 |
| 2019/0131804 A1* | 5/2019 | Taniguchi | B60R 16/033 |
| 2022/0069609 A1* | 3/2022 | Jeong | H02J 7/0031 |
| 2022/0105793 A1* | 4/2022 | Sukhatankar | B60K 25/06 |
| 2022/0285803 A1* | 9/2022 | Hsiao | G01R 31/3644 |

FOREIGN PATENT DOCUMENTS

| | | | | |
|---|---|---|---|---|
| CN | 115902687 A | * | 4/2023 | B60L 3/0046 |
| EP | 1901412 A2 | * | 3/2008 | B60L 3/0038 |

\* cited by examiner

HIGH-VOLTAGE COMPONENT PROTECTION DURING VEHICLE RECHARGING

TECHNICAL FIELD

The present disclosure relates to a system and a method for high-voltage component protection during vehicle recharging.

INTRODUCTION

Many electrical systems in electric vehicles operate at the same high voltages specified for the battery packs of the electric vehicle. A recharging voltage greater than the battery pack high voltages are sometimes used to shorten recharge times. The recharging voltage may be imposed on the electrical systems due to fault conditions. The fault conditions may include loss of isolation and resistive shorts. For example, faults in one electrical system may couple the recharge voltage to the other electrical systems through common chassis connections that are otherwise high-impedance isolated from each other. The faults may generate unwanted chassis currents and/or excessive voltage that may cause nonreversible hardware degradations if exposed to the excessive voltages for a prolonged accumulated time. Accordingly, those skilled in the art continue with research and development efforts in the field of high-voltage component protection during electric vehicle recharging.

SUMMARY

A protection system for a high-voltage component is provided herein. The protection system includes a switching circuit and a protection controller. The switching circuit is couplable to a plurality of battery packs and the high-voltage component. The switching circuit is configured to change a variable arrangement of the plurality of battery packs between a parallel arrangement and a series arrangement, and transfer power from the plurality of battery packs to the high-voltage component. Each of the plurality of battery packs operates at a battery voltage. The high-voltage component operates at the battery voltage. The high-voltage component includes an input node and a floating chassis ground. The protection controller is coupled to the switching circuit and the high-voltage component. The protection controller is configured to command the switching circuit into the series arrangement in response to a first recharging session, command a first flow of a first current in the first recharging session, measure a measured voltage between the input node and the floating chassis ground of the high-voltage component during the first recharging session, advance a timer while the measured voltage indicates a presence of an improper voltage between the input node and the floating chassis ground, and cancel the first recharging session in response to the presence of the improper voltage for greater than an exposure time. The first recharging session provides a first direct-current fast-charging voltage to the plurality of battery packs in the series arrangement. The first direct-current fast-charging voltage is greater than the battery voltage.

In one or more embodiments of the protection system, the protection controller is further configured to command the switching circuit into the parallel arrangement after the first recharging session has been cancelled, and maintain the parallel arrangement of the plurality of battery packs while the protection system has been moved less than a threshold distance since the first recharging session was cancelled due to the improper voltage.

In one or more embodiments of the protection system, the protection controller is further configured to enable the series arrangement of the plurality of battery packs in response to the protection system being moved greater than the threshold distance since the first recharging session was cancelled due to the improper voltage.

In one or more embodiments of the protection system, the protection controller is further configured to command a flow of current in a second recharging session while the plurality of battery packs are in the parallel arrangement. The second recharging session provides a second direct-current fast-charging voltage to the plurality of battery packs in the parallel arrangement. The second direct-current fast-charging voltage approximately matches the battery voltage.

In one or more embodiments of the protection system, the protection controller is further configured to prohibit the series arrangement of the plurality of battery packs in response to the timer exceeding a cumulative time.

In one or more embodiments, the protection system includes a maintenance port coupled to the protection controller and configured to receive a notice that service has been performed on the high-voltage component. The protection controller is further configured to enable the series arrangement of the plurality of battery packs in response to the notice.

In one or more embodiments of the protection system, the cumulative time is approximately 600 seconds, and the exposure time is approximately 5 seconds.

In one or more embodiments of the protection system, the input node of the high-voltage component includes a positive input node and a negative input node. The measured voltage includes a positive measured voltage between the positive input node and the floating chassis ground, and a negative measured voltage between the negative input node and the floating chassis ground. The presence of the improper voltage is determined by the protection controller based on one or more of the positive measured voltage and the negative measured voltage.

In one or more embodiments of the protection system, the battery voltage is approximately 400 volts, and the first direct-current fast-charging voltage is approximately 800 volts.

A method for fault detection while recharging a vehicle is provided herein. The method includes changing a variable arrangement of a plurality of battery packs of the vehicle from a parallel arrangement to a series arrangement in response to a first recharging session. Each one of the plurality of battery packs operates at a battery voltage. The method includes transferring power from the plurality of battery packs to a high-voltage component of the vehicle. The high-voltage component operates at the battery voltage, and includes an input node and a floating chassis ground. The method further includes commanding a first flow of a first current in the first recharging session with a protection controller of the vehicle. The first recharging session provides a first direct-current fast-charging voltage to the plurality of battery packs in the series arrangement. The first direct-current fast-charging voltage is greater than the battery voltage. The method includes measuring a measured voltage between the input node and the floating chassis ground of the high-voltage component during the first recharging session, advancing a timer while the measured voltage indicates a presence of an improper voltage between the input node and the floating chassis ground of the high-voltage component, and cancelling the first recharging session in response to the presence of the improper voltage at the high-voltage component for greater than an exposure time.

In one or more embodiments, the method includes rearranging the plurality of battery packs to the parallel arrangement after the first recharging session has been cancelled, and maintaining the parallel arrangement of the plurality of battery packs while the vehicle has been driven less than a threshold distance since the first recharging session was cancelled due to the improper voltage.

In one or more embodiments, the method includes enabling the series arrangement of the plurality of battery packs in response to the vehicle being driven greater than the threshold distance since the first recharging session was cancelled due to the improper voltage.

In one or more embodiments, the method includes commanding a second flow of a second current in a second recharging session while the plurality of battery packs are in the parallel arrangement. The second recharging session provides a second direct-current fast-charging voltage to the plurality of battery packs in the parallel arrangement. The second direct-current fast-charging voltage approximately matches the battery voltage.

In one or more embodiments, the method includes prohibiting the series arrangement of the plurality of battery packs in response to the timer exceeding a cumulative time.

In one or more embodiments, the method includes enabling the series arrangement of the plurality of battery packs in response to a notice that service has been performed on the vehicle.

In one or more embodiments of the method, the cumulative time is approximately 600 seconds, and the exposure time is approximately 5 seconds.

A vehicle is provided herein. The vehicle includes a plurality of battery packs, a high-voltage component, a switching circuit, and a protection controller. Each of the plurality of battery packs operates at a battery voltage. The high-voltage component has an input node and a floating chassis ground. The high-voltage component operates at the battery voltage. The switching circuit is coupled to the plurality of battery packs and the high-voltage component, and is couplable to a charging station. The switching circuit is configured to change a variable arrangement of the plurality of battery packs between a parallel arrangement and a series arrangement, and transfer power from the plurality of battery packs to the high-voltage component. The protection controller is coupled to the switching circuit and the high-voltage component, and is couplable to the charging station. The protection controller is configured to command the switching circuit into the series arrangement in response to a recharging session, command a flow of a current from the charging station in the recharging session, measure a measured voltage between the input node and the floating chassis ground of the high-voltage component during the recharging session, advance a timer while the measured voltage indicates a presence of an improper voltage between the input node and the floating chassis ground of the high-voltage component, and cancel the recharging session in response to the presence of the improper voltage from greater than an exposure time.

In one or more embodiments of the vehicle, the input node of the high-voltage component includes a positive input node and a negative input node. The measured voltage includes a positive measured voltage between the positive input node and the floating chassis ground, and a negative measured voltage between the negative input node and the floating chassis ground. The presence of the improper voltage is based on one or more of the positive measured voltage and the negative measured voltage.

In one or more embodiments, the vehicle includes a sensor configured to measure a speed of the vehicle. The protection controller is further configured to disable the series arrangement of the plurality of battery packs in response to the speed being less than a threshold speed since the recharging session was cancelled due to the improper voltage, and enable the series arrangement of the plurality of battery packs in response to the speed being greater than the threshold speed since the recharging session was cancelled due to the improper voltage.

In one or more embodiments of the vehicle, the protection controller is further configured to prohibit the series arrangement of the plurality of battery packs in response to the timer exceeding a cumulative time, and enable the series arrangement of the plurality of battery packs in response to a notice that service has been performed on the vehicle. The above features and advantages and other features and advantages of the present disclosure are readily apparent from the following detailed description of the best modes for carrying out the disclosure when taken in connection with the accompanying drawings.

DETAILED DESCRIPTION

Various embodiments of the disclosure generally provide for a system and/or a method to protect high-voltage components in vehicles from isolation faults where a high-voltage (HV) architecture includes a recharge capability at extra-high voltages (EHV) by connecting multiple battery packs in series. While an extra-high voltage (e.g., 800 Vdc) is imposed on the high-voltage components (e.g., 400 Vdc) between high-voltage rails and chassis during the recharge, the system/method senses excessive voltages, measures a cumulative exposure time that the excessive voltages are present, and take corrective action if the excessive voltages do not subside. If the cumulative exposure time is greater than a short limit, the system/method may end the recharging session and disable the extra-high-voltage recharging. The extra-high-voltage recharging may be re-enabled if the vehicle has been moved at least a certain distance away from and/or traveled above a certain speed after leaving the charging station. The re-enabling feature generally extends the extra-high-voltage recharging capability of the vehicle by allowing for transient fault isolation issues. If the cumulative time of exposure for the high-voltage components becomes too long, the system/method may prohibit future extra-high-voltage recharging sessions until maintenance has been performed.

Embodiments of the system/method may provide for recharging at multiple different voltage levels. In various embodiments, the vehicle battery packs may be recharged at the regular high-voltage levels of the battery packs. Therefore, the vehicle may recharge at extra-high-voltage charging stations while few or no fault isolation issues are present. Once a detected fault becomes a threat to the high-voltage component, or where the extra-high-voltage charging stations are not available, the vehicle may recharge at regular high-voltage charging stations.

Figure 1:
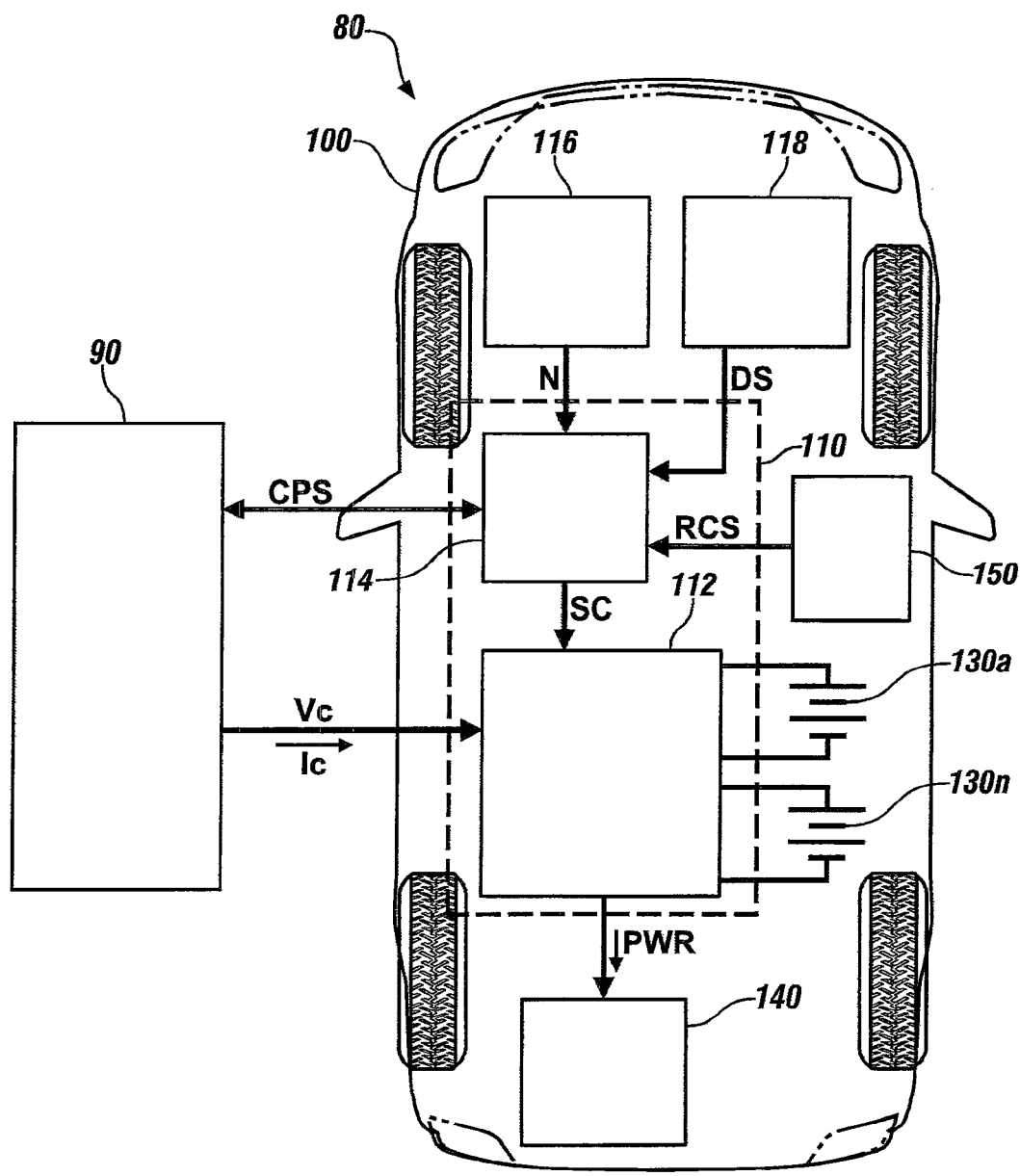
FIG. 1 is a schematic plan diagram of a system in accordance with one or more exemplary embodiments.

Referring to FIG. 1, a schematic plan diagram of an example implementation of a system 80 is shown in accordance with one or more exemplary embodiments. The system 80 generally comprises a charging station 90 and a vehicle 100 having a protection system 110. The protection system 110 includes a switching circuit 112 and a protection controller 114. The vehicle 100 further includes a maintenance port 116, a sensor 118, multiple battery packs 130a-130n, a high-voltage component 140, and driver controls 150.

The charging station 90 and the protection controller 114 communicate bidirectionally through a control pilot signal (CPS). The control pilot signal is used to sense, initiate, control, and end a recharging session between the charging station 90 and the vehicle 100. During the recharging session, the charging station 90 may provide a recharging voltage (Vc) and a recharging current (Ic) to the vehicle 100. The recharging voltage Vc may range from approximately 270 Vdc to approximately 1600 Vdc. The recharging current Ic may range from approximately 6 amperes to approximately 100 amperes.

The protection controller 114 may generate a switch control signal (SC) that is transferred to the switching circuit 112. The switch control signal SC may convey various commands to control an arrangement of the battery packs 130a-130n. The switch control signal SC may also convey information used by the switching circuit 112 to signal an end to a recharging session with the charging station 90. The maintenance port 116 may couple to external test equipment and present a notice signal (N) from that external test equipment to the protection controller 114. The notification signal N generally informs the protection controller 114 that a previously-disabled extra-high-voltage recharging session may be enabled.

A distance/speed signal (DS) is generated by the sensor 118 and transferred to the protection controller 114. The distance/speed signal DS may carry data regarding how far and/or how fast the vehicle 100 has moved. A recharge selection signal (RCS) may be generated by the driver controls 150 and received by the protection controller 114. The recharge selection signal RCS carries commands from the driver indicating what voltage level recharge (e.g., a high-voltage recharge, an extra-high-voltage recharge, or another voltage level recharge) is about to take place. The switching circuit 112 may provide electrical power (PWR) to the high-voltage component 140. The electrical power PWR may be presented at a regular battery voltage of the battery packs 130a-130n.

The charging station 90 implements a direct-current fast charging (DCFS) station. In some embodiments, the charging station 90 may be operational to provide the recharging voltage Vc at a high-voltage level (e.g., approximately 400 Vdc). In other embodiments, the charging station 90 may be operational to provide the recharging voltage Vc at an extra-high-voltage level (e.g., approximately 800 Vdc). Other recharging voltage Vc may be implemented to meet a design criteria of a particular application.

The charging station 90 may also be operational to communicate with the protection controller 114 via the control pilot signal CPS. In various embodiments, the charging stations 90 may be compliant with the SAE International J1772 standard and/or the International Electrotechnical Commission (IEC) 61851-1 standard. The charging stations 90 may be DC Level 1 and/or DC Level 2 chargers. Other charging standards may be implemented to meet the design criteria of a particular application. Some charging stations 90 may be placed at fixed locations. Other charging stations 90 may be mobile, for example, mounted on a flatbed truck.

The vehicle 100 implements an electric-powered vehicle, a hybrid vehicle, or a plug-in hybrid vehicle. In various embodiments, the electric vehicle 100 may be compliant with the SAE International J1772 standard and/or the International Electrotechnical Commission (IEC) 61851-1 standard. The electric vehicle 100 may implement the DC Level 1 and/or DC Level 2 charging capabilities. Other standards may be implemented to meet the design criteria of a particular application. In various embodiments, the electric vehicle 100 may include, but are not limited to, passenger vehicles, trucks, autonomous vehicles, motorcycles, boats, and/or aircraft. In some embodiments, the electric vehicle 100 may be a stationary object such as a room, a booth and/or a stationary structure. Other types of electric vehicles 100 may be implemented to meet the design criteria of a particular application.

The protection system 110 implements a fault isolation protection system. The protection system 110 is operational to change a variable arrangement of the battery packs 130a-130n between a parallel arrangement and a series arrangement in response to one or more fault detections. The selection of arrangements is based on the voltage levels being used in a current recharging session. The protection system 110 transfers recharging power from the charging station 90 to the battery packs 130a-130n while the battery packs 130a-130n are in the parallel arrangement or the series arrangement. The protection system 110 also transfers the electrical power PWR from the battery packs 130a-130n to the high-voltage component 140 while the battery packs 130a-130n are in the parallel arrangement or the series arrangement. One or more voltage between a corresponding one or more input nodes of the high-voltage component 140 and a floating chassis ground of the high-voltage component 140 are measured during the recharging session. A timer is advanced while the measured voltage(s) indicate a presence of an improper voltage between the input node(s) and the floating chassis ground. In response to the presence of the improper voltage at the high-voltage component for greater than an exposure time, the recharging session is ended and the battery packs 130a-130n are configured to the parallel arrangement.

The switching circuit 112 implements high-powered switches and a controller capable of communicating with the charging station 90. The switching circuit 112 is operational to arrange selectively the battery packs 130a-130n in a parallel arrangement or a series arrangement. While in the parallel arrangement, each battery pack 130a-130n contributes to the electrical power PWR supped to the high-voltage component 140, and each battery pack 130a-130n is recharged by a portion of the recharging current Ic. While in the series arrangement, at least one of the battery packs 130a-130n provides the electrical power PWR supplied to the high-voltage component 140, the battery packs 130a-130n are recharged by the full recharging current Ic. The switching circuit 112 is also operational to communicate with the charging station 90 via the control pilot signal CPS. The control pilot signal CPS may be used to inform the charging station 90 that the vehicle 100 is in a standby state waiting for the recharging session, that the vehicle 100 is present and connected, that the recharging session should begin, that the recharging session should begin with ventilation, that the recharging session should end, and that an error has been detected.

The protection controller 114 implements a computer configured to protect the high-voltage component 140 from excessive voltages during the recharging sessions. For an extra-high-voltage recharging session, the protection controller 114 is operational to command the switching circuit 112 to configure the battery packs 130a-130n into the series arrangement, command the charging station 90 to provide electrical power to recharge the battery packs 130a-130n, sense a measured voltage between one or more of the input nodes and the floating chassis ground of the high-voltage component 140 during the recharging session. The protection controller 114 may advance a timer while the measured voltage indicates a presence of an improper voltage between the input node(s) and the floating chassis ground, cancel the recharging session with the charging station 90 in response to either the presence of the improper voltage for greater than an exposure time or the battery packs 130a-130n have been recharged, and command the switching circuit 112 to configure the battery packs 130a-130n into the parallel arrangement after the recharging session has been ended.

For a high-voltage recharging session, the protection controller 114 is operational to command the switching circuit 112 to configure the battery packs 130a-130n in the parallel arrangement, command the charging station 90 to generate a flow of the recharging current Ic in another recharging session, and end the recharging session in response to the battery packs 130a-130n being recharged.

The maintenance port 116 implements a connector accessible by service personnel. The maintenance port 116 is operational to convey the notification signal N from test equipment (not shown) to the protection controller 114.

The sensor 118 implements a distance sensor and/or a speed sensor. For distance, the sensor 118 is operational to measure a running distance traveled by the vehicle 100. For speed, the sensor 118 is operational to measure a current speed of the vehicle 100. The distance and/or speed may be reported to the protection controller 114 via the distance/speed signal DS.

Each battery pack 130a-130n implements a rechargeable energy storage system. While recharging, the battery packs 130a-130n may receive electrical power from the charging station 90. While recharging and discharging, the battery packs 130a-130n may present electrical power to the high-voltage component 140. Each battery pack 130a-130n operates at a battery voltage Vb (see FIG. 2) In various embodiments, the battery packs 130a-130n may be implemented in two sets such that the extra-high-voltage may be 2 Vb while the two sets are arranged in series. Each set may contain one or more battery packs 130a-130n connected in parallel within the set. In some embodiments, the battery packs 130a-130n may be implemented in three sets such that the extra-high-voltage may be 3 Vb while the three sets are in the series arrangement. Other number of sets may be implemented to meet the design criteria of a particular application.

The high-voltage component 140 implements one or more electrical circuits in the vehicle 100 that operate at the battery voltage. The high-voltage component 140 may include, but is not limited to, electrical motors, and pumps. Other high-voltage components 140 may be implemented to meet a design criteria of a particular application.

The driver controls 150 implement human-machine-interface actuators and indicators. The driver controls 150 are operational to receive inputs from the vehicle driver, and present information to the driver. One of the inputs includes a selection for the recharge voltage Vc that will be used to recharge the battery packs 130a-130n. The selected recharge voltage (e.g., 400 Vdc or 800 Vdc) may be presented to the protection controller 114 in the recharging selection signal RCS. The driver control 150 may also be operational to present an error indicator to the driver in the event that the extra-high-voltage recharge is selected while the extra-high-voltage recharge is prohibited.

Generally, the protection system 110 prevents the high-voltage component 140 from exposure to excessive voltages greater than several hundred volts (e.g., approximately 450 V) from a positive high-voltage rail to vehicle ground, and from a negative high-voltage rail to vehicle ground for more than a few (e.g., 1-10) seconds during a single exposure, and for more than a cumulated time (e.g., 550-650 second) over a lifetime of the high-voltage component 140. During extra-high-voltage direct-current fast-charging operations, if the protection system 110 detects an excessive positive high-voltage to vehicle ground and/or an excessive negative high-voltage to vehicle ground at the high-voltage component 140 that is greater than the exposure voltage for more than the exposure time limit, a timer is advanced and the series arrangement of the battery packs 130a-130n is disabled. Thereafter, the protection system 110 allow the battery packs 130a-130n to be arranged in parallel, but not arranged in series, until after the vehicle 100 speed is greater than a predetermined speed (e.g., approximately 5 kilometers per hour) and/or the vehicle 100 has driven a predetermined distance (e.g., approximately 50 meters). When the accumulated time above the exposure voltage is greater than the cumulative time, the series arrangement of the battery packs 130a-130n is prohibited and a fault latch is set in the protection controller 114. The series arrangement of the battery packs 130a-130n, and thus recharging at the extra-high-voltage is prohibited (or locked out) until service has replaced the damaged high-voltage component 140 and the fault latch has been cleared by applying the notification signal N.

An example occurrence rate of isolation faults by model year for an existing make of an electric vehicle is provided in Table I as follows:

TABLE I

Total Population 78000

| Year | Unique Vehicle ID Numbers (VINS) | Occurrences | Average per VIN |
|---|---|---|---|
| 2017 | 115 | 1852 | 16.10 |
| 2018 | 118 | 720 | 6.10 |
| 2019 | 208 | 1579 | 7.59 |
| 2202 | 37 | 778 | 21.03 |
| 2021 | 7 | 377 | 53.86 |

Figure 2:
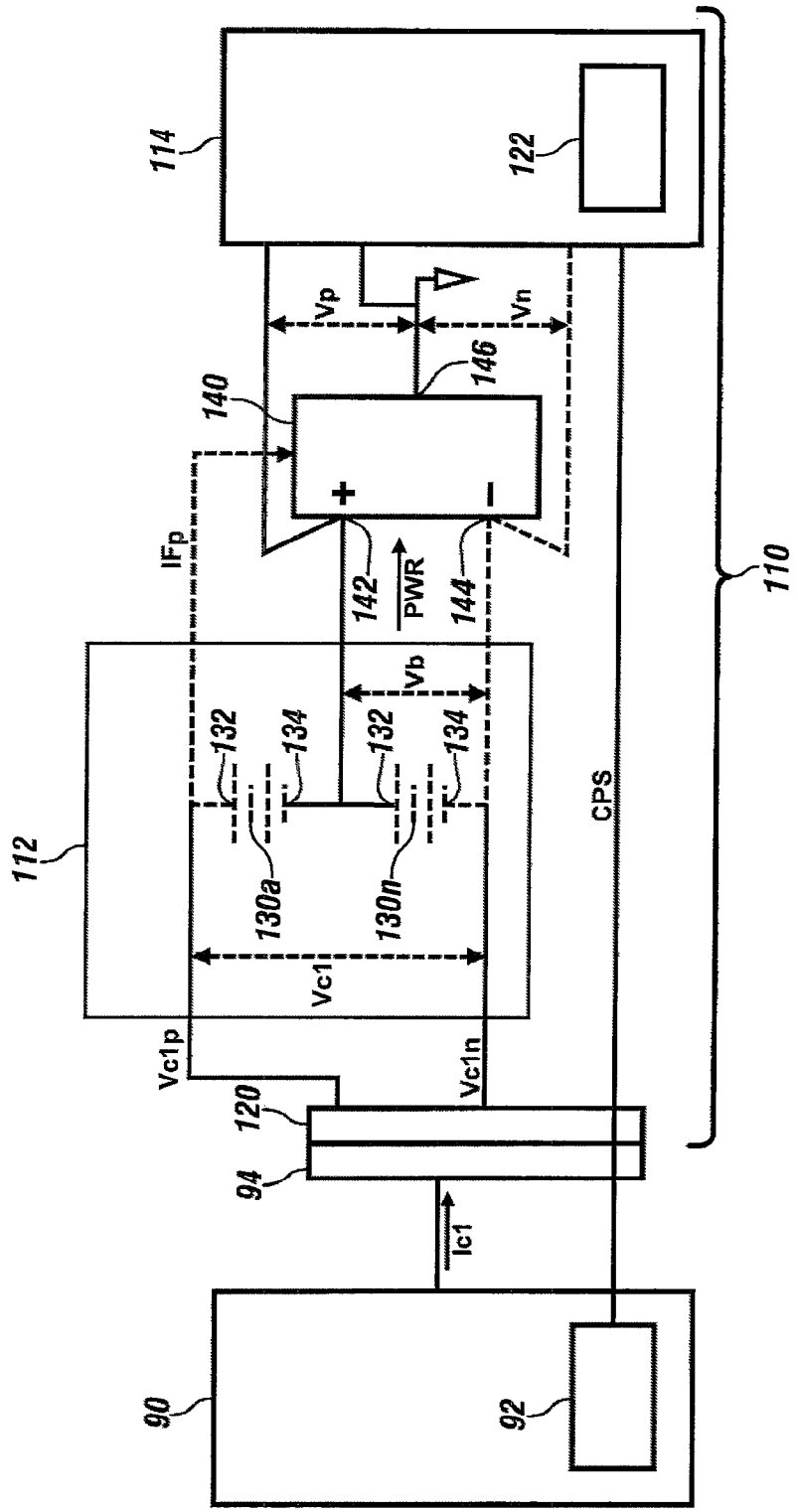
FIG. 2 is a schematic diagram of a protection system in a first extra-high-voltage configuration in accordance with one or more exemplary embodiments.

Referring to FIG. 2, a schematic diagram of an example implementation of the protection system 110 in a first extra-high-voltage configuration is shown in accordance with one or more exemplary embodiments. The charging station 90 generally includes a station controller 92 and a plug 94. The protection controller 114 includes a vehicle controller 122. A socket 120 is couplable to the plug 94 to provide bidirectional communication via the control pilot signal CPS, and recharging of the battery packs 130a-130n with a first recharging current Ic1 during a first recharging session. The first recharging current Ic1 may be a variation of the recharging current Ic (FIG. 1).

The charging station 90 may present the recharging power as a positive first direct-current fast-charging voltage Vc1$p$ coupled to one end of the series arrangement, and a negative first direct-current fast-charging voltage Vc1$n$ coupled to the opposite end of the series arrangement. The resulting recharging voltage may be referred to as a first direct-current fast-charging voltage Vc1, or a first recharging voltage Vc1 for short. The first recharging voltage Vc1 may be a variation of the recharging voltage Vc (FIG. 1).

The switching circuit 112 is configured to arrange the battery packs 130a-130n in a series arrangement. Each battery pack 130a-130n may have a positive terminal 132 and a negative terminal 134. Each battery pack 130a-130n operates at a battery voltage Vb. An end battery pack (e.g., 130n) in the series arrangement of the battery packs 130a-130n may provide the electrical power PWR to the high-voltage component 140. As such, the high-voltage component 140 may receive electrical power while the battery packs 130a-130n are being recharged.

The high-voltage component 140 generally includes a positive input node 142, negative input node 144, and floating chassis ground 146. The positive input node 142 and the negative input node 144 are coupled across the last battery pack 130n. The floating chassis ground 146 is coupled to a frame of the vehicle 100 and is isolated from earth ground by the tires. A positive fault isolation path IFp may exist between the positive first direct-current fast-charging voltage Vc1$p$ and the chassis (e.g., the floating chassis ground 146) of the high-voltage component 140.

The protection controller 114 may be coupled to the positive input node 142, the negative input node 144 and the floating chassis ground 146 of the high-voltage component 140. The protection controller 114 is operational to measure a positive measured voltage Vp between the positive input node 142 and the floating chassis ground 146. The protection controller 114 is also operational to measure a negative measured voltage Vn between the negative input node 144 and the floating chassis ground 146. One or both of the positive measured voltage Vp and the negative measured voltage Vn may determine if the positive fault isolation IFp exists, and if so, the extent of the fault. The vehicle controller 122 is in communication with the station controller 92 via the control pilot signal CPS.

Under normal conditions (e.g., no isolation fault present), the internal resistance of the high-voltage component 140 may present similar impedances between the floating chassis ground 146 and each of the positive input node 142 and the negative input node 144. As such, the positive measured voltage Vp and the negative measured voltage Vn should be approximately half (e.g., +200 Vdc and −200 Vdc respectively) of the battery voltage Vb (e.g., 400 Vdc) relative to the floating chassis ground 146. When the positive isolation fault exists, the positive first direct-current fast-charging voltage Vc1$p$ is pulled down toward the floating chassis ground 146 of the high-voltage component 140. The extent of the pull is based on the impedance of the positive isolation fault IFp. The pull reduces the positive measured voltage Vp and increases that negative measured voltage Vn. For example, if the positive fault isolation IFp is a short-circuit, the positive measured voltage Vp would be −400 Vdc relative to the floating chassis ground 146 due to the battery pack 130a, and the negative measured voltage Vn would be −800 Vdc relative to the floating chassis ground 146 due to the series arrangement of the battery packs 130a-130n.

Once the negative measured voltage Vn is lower than the excessive voltage (e.g., drops 250 volts from −200 Vdc to −450 Vdc) and/or the positive measured voltage Vp falls a similar voltage (e.g., drops 250 volts from +200 Vdc to −50 Vdc), the protection controller 114 may conclude that the positive isolation fault IFp is substantial and activates an internal timer. If the positive isolation fault IFp continues for at least the exposure time, the protection controller 114, through the vehicle controller 122, may signal the station controller 92 to end the first charging session.

Figure 3:
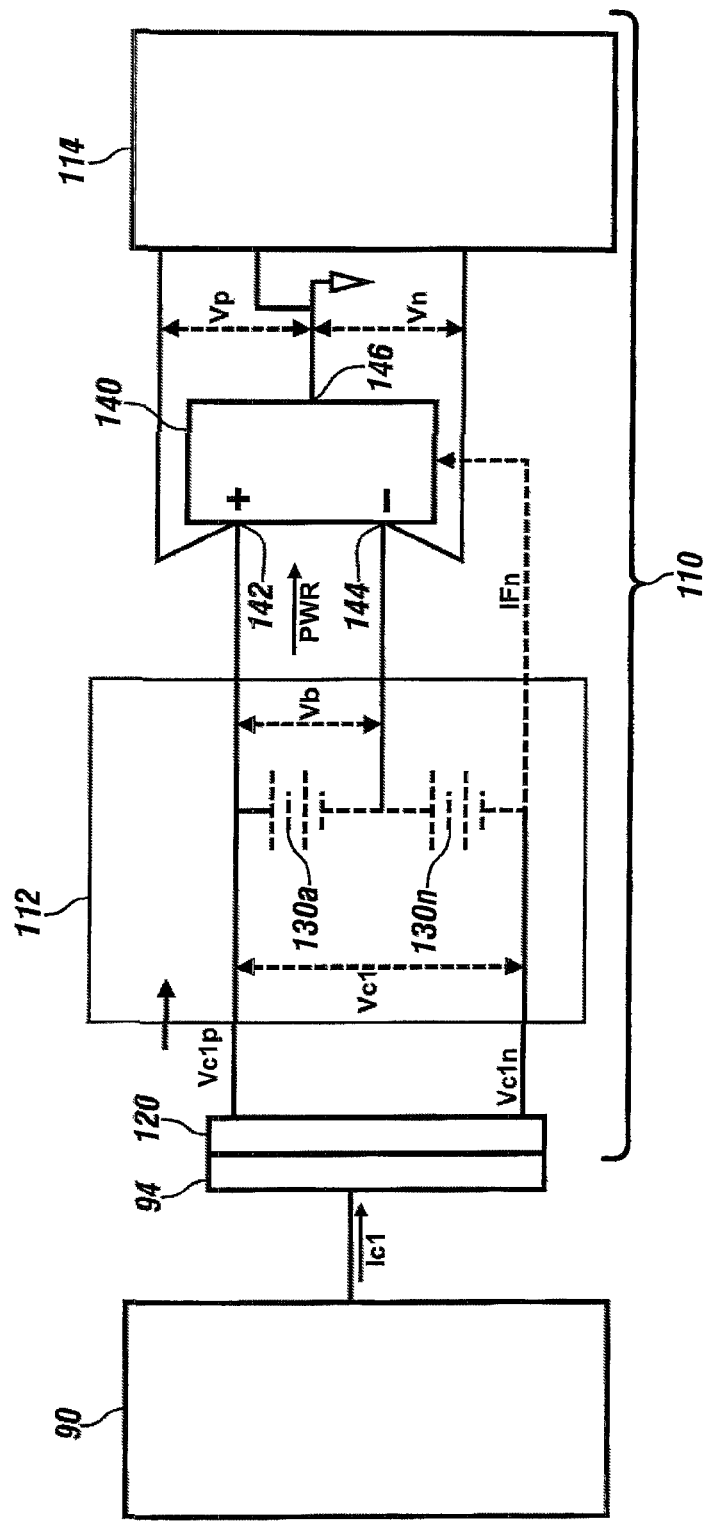
FIG. 3 is a schematic diagram of the protection system in a second extra-high-voltage configuration in accordance with one or more exemplary embodiments.

Referring to FIG. 3, a schematic diagram of an example implementation of the protection system 110 in a second extra-high-voltage configuration is shown in accordance with one or more exemplary embodiments. The circuitry and voltages shown in FIG. 3 are similar to the circuitry and voltages shown in FIG. 2, expect the high-voltage component 140 is coupled to the top battery pack 130a, and a negative isolation fault IFn may exist between the negative first direct-current fast-charging voltage Vc1$n$ and the floating chassis ground 146.

As before with no isolation faults present, the positive measured voltage Vp and the negative measured voltage Vn should be approximately half (e.g., +200 Vdc and −200 Vdc respectively) of the battery voltage Vb (e.g., 400 Vdc) relative to the floating chassis ground 146. When the negative isolation fault exists, the negative first direct-current fast-charging voltage Vc1$n$ is pulled up toward the floating chassis ground 146 of the high-voltage component 140. The extent of the pull is based on the impedance of the negative isolation fault IFn. The pull increases the positive measured voltage Vp and decreases that negative measured voltage Vn. For example, if the negative fault isolation IFn is a short-circuit, the positive measured voltage Vp would be +800 Vdc relative to the floating chassis ground 146 due to the battery packs 130a-130n, and the negative measured voltage Vn would be +400 Vdc relative to the floating chassis ground 146 due to the battery pack 130n.

Once the positive measured voltage Vp is above than the excessive voltage (e.g., increases 250 volts from +200 Vdc to +450 Vdc) and/or the negative measured voltage Vn rises a similar voltage (e.g., increases 250 volts from −200 Vdc to +50 Vdc), the protection controller 114 may conclude that the negative isolation fault IFp is substantial and activates an internal timer. If the negative isolation fault IFn continues for at least the exposure time, the protection controller 114, through the vehicle controller 122, may signal the station controller 92 to end the first charging session.

Figure 4:
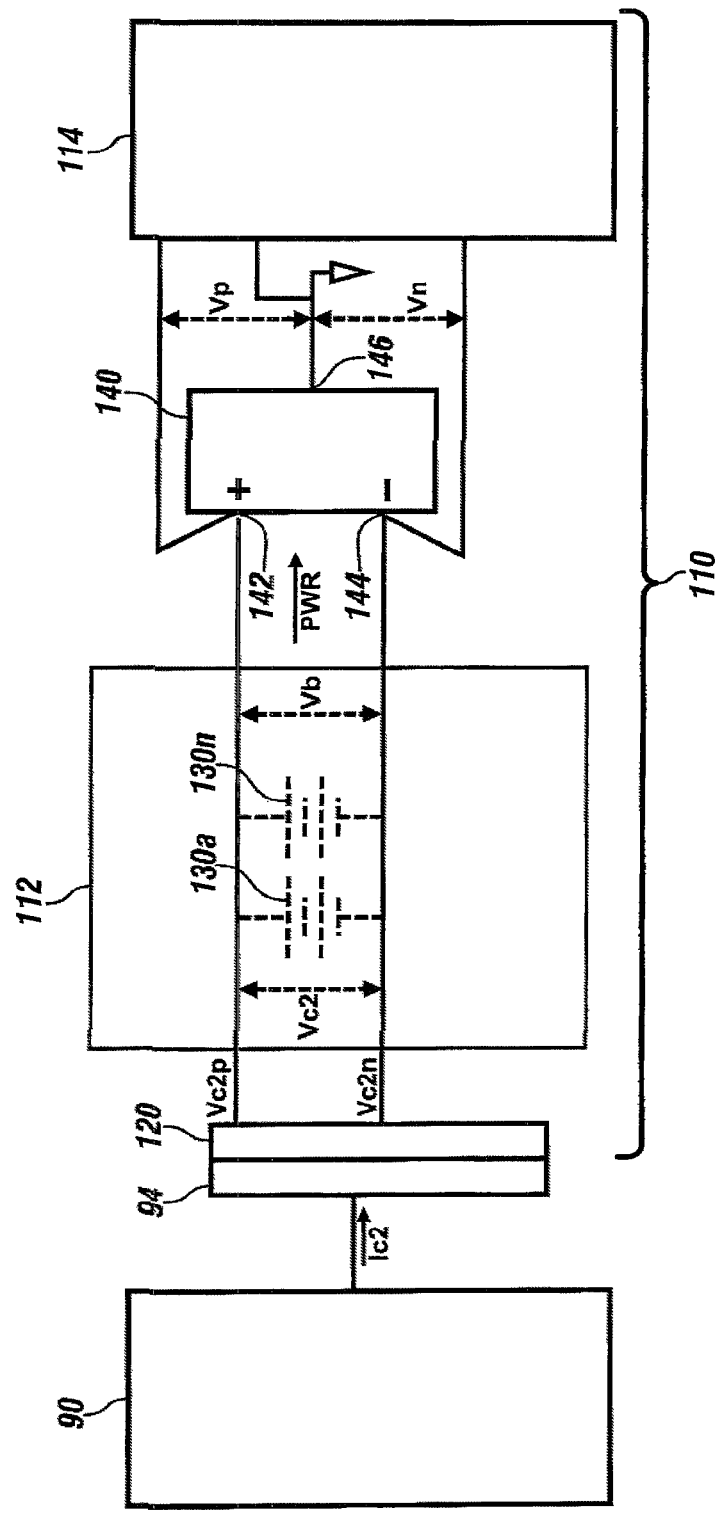
FIG. 4 is a schematic diagram of the protection system in a high-voltage configuration in accordance with one or more exemplary embodiments.

Referring to FIG. 4, a schematic diagram of an example implementation of the protection system 110 in a high-voltage configuration is shown in accordance with one or more exemplary embodiments. The circuitry and voltages shown in FIG. 4 are similar to the circuitry and voltages shown in FIG. 2, expect the battery packs 130a-130n are configured in the parallel arrangement, and the charging station 90 present a second current Ic2 at a second direct-current fast-charging voltage Vc2 (e.g., 400 Vdc). The second direct-current fast-recharge voltage Vc2 may be referred to as a second recharging voltage Vc2 for short. The second recharging voltage Vc2 may be a variation of the recharging voltage Vc (FIG. 1). The second recharging voltage Vc2 approximately matches the battery voltage Vb.

If either of the positive second direct-current fast-charging voltage Vc2p or the negative second direct-current fast-charging voltage Vc2n is short-circuited to the floating chassis ground 146 of the high-voltage component 140, one of the positive measured voltage Vp or the negative measured voltage Vn would be driven to zero volts, and the other measured voltage would be +400 Vdc or −400 Vdc relative to the floating chassis ground 146. In either case, an amplitude of neither the positive measured voltage Vp nor the negative measured voltage Vn would exceed the excessive voltage (e.g., 450 Vdc) and so no threat is posed to the high-voltage component 140. As such, the protection controller 114 would not stop the charging session and the battery packs 130a-130n would continue to recharge as planned.

Figure 5:
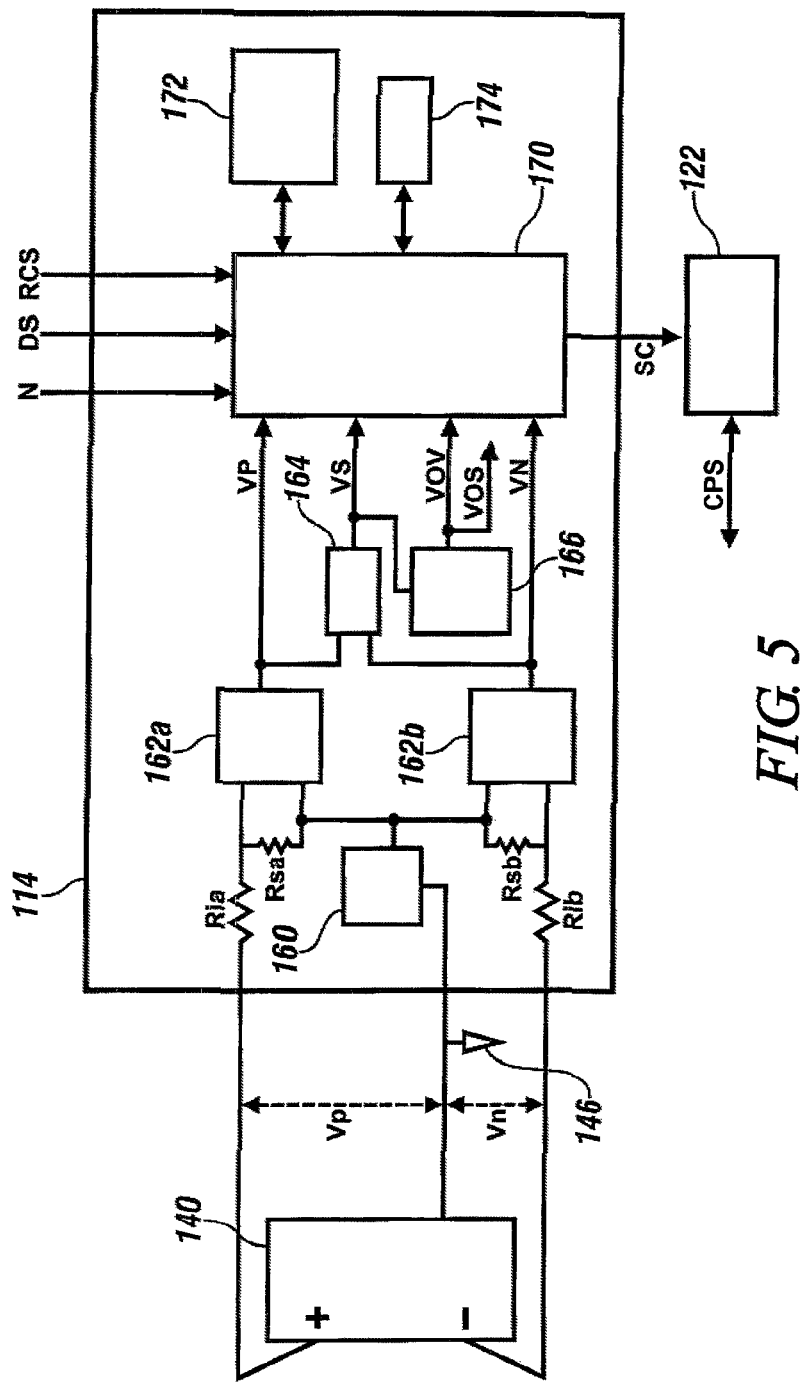
FIG. 5 is a schematic diagram of a protection controller in accordance with one or more exemplary embodiments.

Referring to FIG. 5, a schematic diagram of an example implementation of the protection controller 114 is shown in accordance with one or more exemplary embodiments. The protection controller 114 generally includes a reference voltage circuit 160, a positive sensor circuit 162a, a negative sensor circuit 162b, a summation circuit 164, a hardware overvoltage protection circuit 166, one or more processors 170 (one shown), a memory circuit 172, a timer 174, a positive rail isolation resistor Ria, a negative rail isolation resistor Rib, a positive rail sensing resistor Rsa, and a negative rail sensing resistor Rsb.

The reference voltage circuit 160 implements a reference voltage generator. The reference voltage circuit 160 is operational to generate a low reference voltage (e.g., +2.5 Vdc) relative to the floating chassis ground 146.

The positive sensor circuit 162a implements a voltage sensor. The positive sensor circuit 162a is operational to measure a voltage across the positive rail sensing resistor Rsa. The measured voltage is presented to the processor 170 and the summation circuit 164 as a positive voltage value (VP). The positive voltage value VP is a fraction of the positive measured voltage Vp. The fraction is determined by the positive rail isolation resistor Ria and the positive rail sensing resistor Rsa.

The negative sensor circuit 162b implements another voltage sensor. The negative sensor circuit 162b is operational to measure a voltage across the negative rail sensing resistor Rsb. The measured voltage is presented to the processor 170 and the summation circuit 164 as a negative voltage value (VN). The negative voltage value VN is a fraction of the negative measured voltage Vn. The fraction is determined by the negative rail isolation resistor Rib and the negative rail sensing resistor Rsb.

The summation circuit 164 implements an adder circuit. The summation circuit 164 is operational to add the positive voltage value VP and the negative voltage value VN to calculate a summed voltage value (VS). The summed voltage value VS is presented to the processor 170 and the hardware overvoltage protection circuit 166.

The hardware overvoltage protection circuit 166 is operational to determine that an overvoltage (e.g., excessive voltage) condition exists. While the overvoltage condition exists, the hardware overvoltage protection circuit 166 is operational to present an overvoltage protection value (VOV) to the processor 170 and assert an overvoltage safety signal (VOS). While the overvoltage conditions is absent, the hardware overvoltage protection circuit 166 de-asserts the overvoltage safety signal VOS. The overvoltage safety signal VOS may be utilized by other circuitry (not shown) to remove the high-voltage power in order to avoid damage.

The processor 170 implements one or more central processing units (CPU). The processor 170 is operational to execute software. The software may be stored in non-transitory computer readable media (e.g., nonvolatile memory). The software, when executed by the processor 170, may cause the processor 170 to monitor the positive measured voltage Vp and/or the negative measured voltage Vn, and take corrective action if either or both show excessive voltages that would indicate an isolation fault that cannot be ignored. Where an isolation fault (e.g., IFp or IFn) posses a risk to the high-voltage component 140, the processor 170 may command the vehicle controller 122 to notify the station controller 92 in the charging station 90 to end the recharging session.

The memory 172 implements one or more memory circuits. The memory 172 is operational to store the software and data used and/or generated by the processor 170. The memory 172 may include non-transitory computer readable medium and volatile memory.

The timer 174 implements a counter. While activated by the processor 170, the timer 174 accumulates (e.g., counts) time and reports the time back to the processor 170. The timer 174 may be deactivated (e.g., stops counting) under the control of the processor 170. The timer 174 may also be reset to an initial (e.g., a zero) count by the processor 170.

In various embodiments, the timer 174 may implement a single timer that reports a current accumulated time. The processor 170 may use the current accumulated time to determine when the exposure time limit has been reached and when the accumulated time limit has been reached. In other embodiments, the timer 174 may implement two timers. One timer may count to the exposure time while active and subsequently report when the exposure time limit has been reached. The other timer may count to the accumulated time while active and subsequently report when the accumulated time limit has been reached. Other forms of timers may be implemented to meet the design criteria of a particular application.

The timer 174 allows multiple occurrences of the fault exposure to be measured before the high-voltage component 140 is considered damaged by an isolation fault. For example, where the accumulated time limit is set to 600 seconds, and the exposure time limit is 5 seconds, the high-voltage component 140 may experience a fault exposure at least 120 times before the protection controller 114 locks out (or prohibits) the extra-high-voltage recharging. Allowing for multiple fault exposures may reduce a potential warranty cost. To further reduce the potential warranty cost, various embodiments may implement separate timers for each multiple high-voltage components 140. Therefore, excessive isolation faults to one of the high-voltage components 140 does not trigger repair/replacement of each high-voltage component 140 at the same time.

Figure 6:
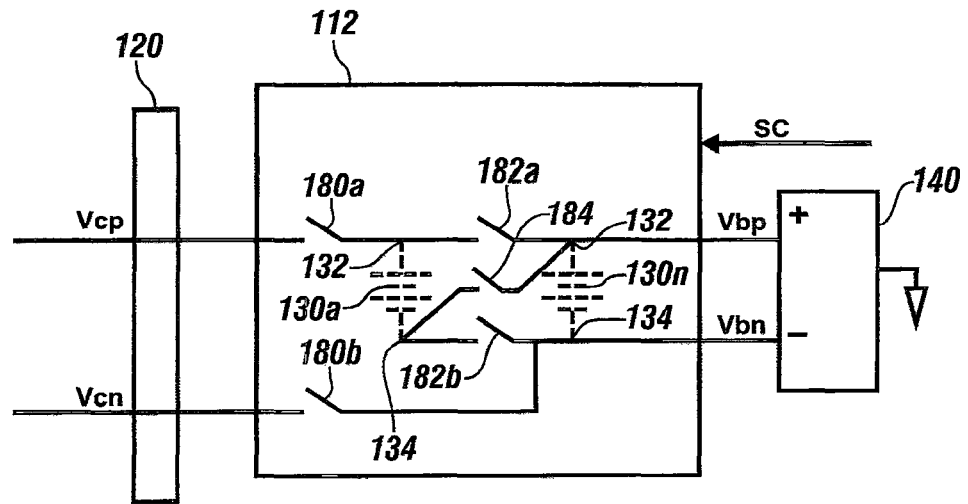
FIG. 6 is a schematic diagram of a switching circuit in accordance with one or more exemplary embodiments.

Referring to FIG. 6, a schematic diagram of an example implementation of the switching circuit 112 is shown in accordance with one or more exemplary embodiments. The switching circuit 112 generally includes a pair of charging switches 180a-180b, a pair of parallel switches 182a-182b, and a series switch 184. The open/closed states of the switches 180a to 184 are controlled by the switch control signal SC.

The charging switches 180a-180b may receive the positive direct-current fast-charging voltage Vcp and the negative direct-current fast-charging voltage Vcn from the socket 120. While the charging switches 180a-180b are open, the switching circuit 112 electrically disconnects the battery packs 130a-130n and the high-voltage component 140 from the charging station 90. While the charging switches 180a-180b are closed. electrical power from the charging station 90 is available to recharge the battery packs 130a-130n.

The parallel switch 182a is disposed between the positive terminals 132 of the battery packs 130a-130n and the parallel switch 182b is disposed between the negative terminals 134 of the battery packs 130a-130n. While the parallel switches 182a-182b are open, the battery packs 130a-130n are electrically isolated from each other and thus available to be connected in series. While the parallel switches 182a-182b are closed and the series switch 184 is open, the battery packs 130a-130n are electrically connected together in parallel.

The series switch 184 is disposed between the positive terminal 132 of the battery pack 130n and the negative terminal 134 of the battery pack 130a. While the series switch 184 is open, the battery packs 130a-130n are available to be connected in parallel. While the series switch 184 is closed and the parallel switches 182a-182b are open, the battery packs 130a-130n are arranged in series.

Figure 7:
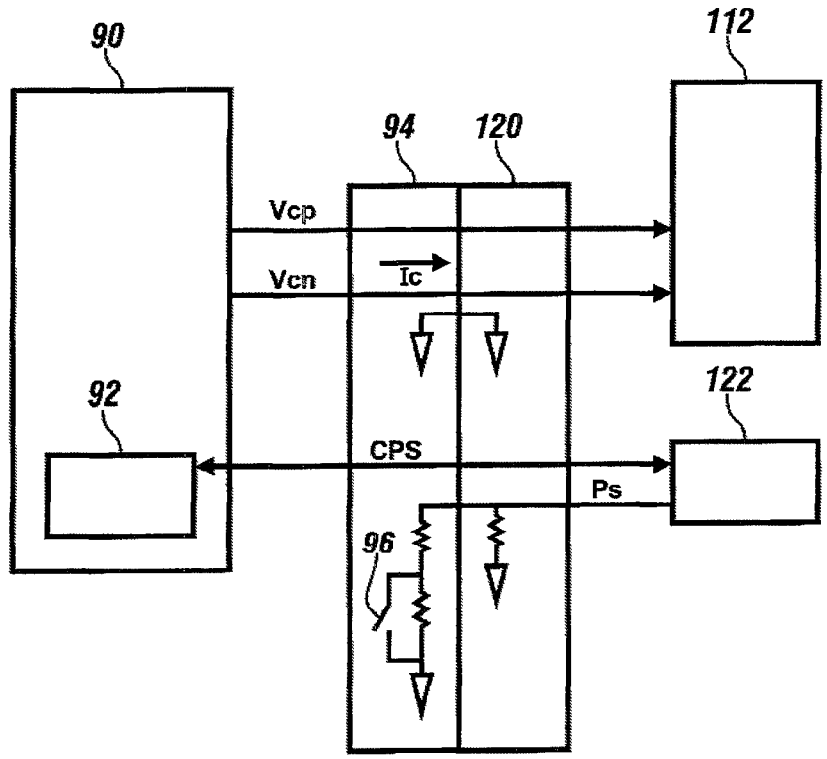
FIG. 7 is a schematic diagram of an interface between the charging station, the switching circuit, and a vehicle controller in accordance with one or more exemplary embodiments.

Referring to FIG. 7, a schematic diagram of an example implementation of an interface between the charging station 90, the switching circuit 112, and the vehicle controller 122 is shown in accordance with one or more exemplary embodiments. While the plug 94 and the socket 120 are engaged, the charging station 90 may provide the charging current Ic through a pair of pins in the plug 94 and the socket 120. A chassis ground is shared through a third pin in the plug 94 and the socket 120. A fourth pin carries the control pilot signal CPS between the station controller 92 and the vehicle controller 122. A proximity signal (PS) is generated by the vehicle controller 122 and presented through a fifth pin of the plug 94 and the socket 120 to a proximity switch 96 in the plug 94. The proximity switch 96 is mechanically linked to a latch release actuator (not shown) on the plug 94. During recharging, the latch release actuator is released and the proximity switch 96 is closed. Therefore, the vehicle controller 122 sees a first load to the chassis ground. When the latch release actuator is grabbed, the proximity switch 96 is open, the vehicle controller 122 sees a different load to the chassis ground, and signals the station controller 92 to stop the recharging session before the power pins are disconnected.

Figure 8:
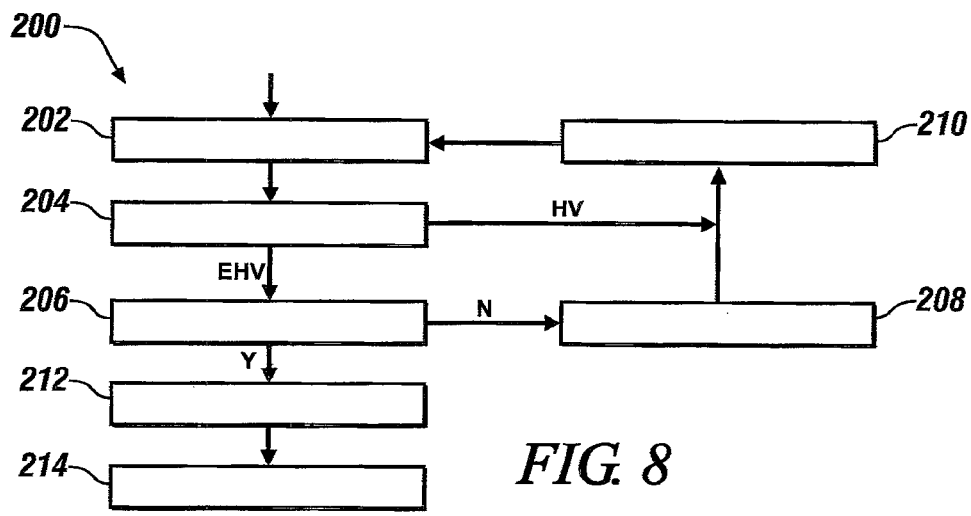
FIG. 8 is a flow diagram of a method for recharging preparation in accordance with one or more exemplary embodiments.

Referring to FIG. 8, a flow diagram of an example implementation of a method 200 for recharging preparation is shown in accordance with one or more exemplary embodiments. The method (or process) 200 is implemented by the system 80. The method 200 includes steps 202 to 214, as illustrated. The sequence of steps is shown as a representative example. Other step orders may be implemented to meet the criteria of a particular application.

In the step 202, before the recharging session begins, the switching circuit 112 configures the battery packs 130a-130n in the parallel arrangement for normal operations. The protection controller 114 may receive the recharge selection signal RCS from the driver controls 150 in the step 204. If extra-high-voltage (EHV) recharging (e.g., 800 Vdc) is selected, the protection controller 114 determines if the extra-high-voltage recharging is enabled in the step 206. If the extra-high-voltage recharging is selected but not enabled (prohibited), an error signal is presented to the driver in the step 208. Thereafter, the switching circuit 112 and the protection controller 114 maintain the battery packs 130a-130n in the parallel arrangement in the step 210 and the method 200 returns to the step 202.

If the extra-high-voltage recharging is selected and enabled, the protection controller 114 commands the switching circuit 112 to configure the battery packs 130a-130n in the step 212 into the series arrangement. While transitioning to and while in the series arrangement, the switching circuit 112 transfers the power from at least one battery pack 130a-130n to the high-voltage component 140 in the step 214. If a high-voltage (HV) recharging (e.g., 400 Vdc) is selected at the step 204, the switching circuit 112 and the protection controller 114 maintain the battery packs 130a-130n in the parallel arrangement in the step 210. The method 200 subsequently returns to the step 202 where electrical power is still presented by the battery packs 130a-130n to the high-voltage component 140.

Figure 9:
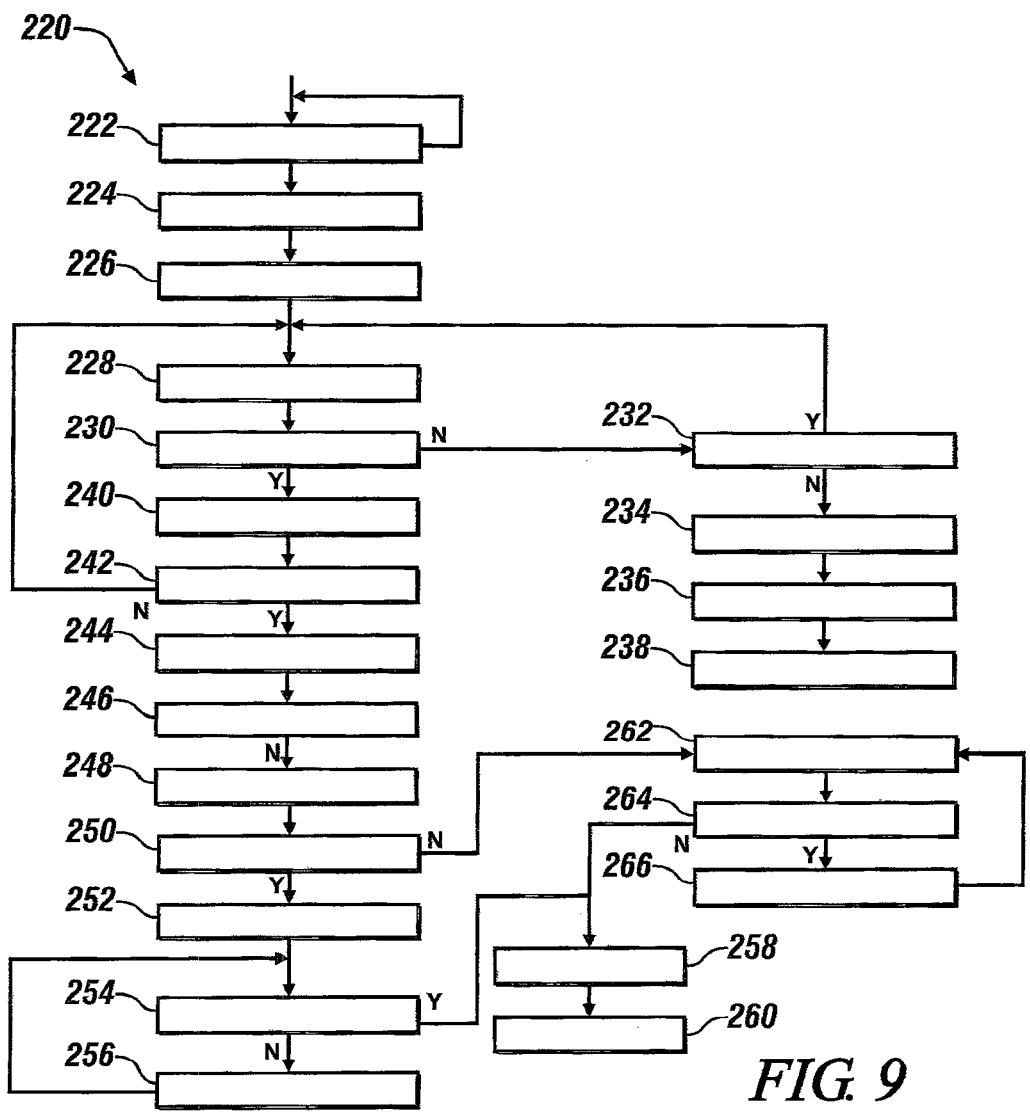
FIG. 9 is a flow diagram of a method for a first recharging session in accordance with one or more exemplary embodiments.

Referring to FIG. 9, a flow diagram of an example implementation of a method 220 for a first recharging session is shown in accordance with one or more exemplary embodiments. The method (or process) 220 may be implemented by the system 80. The first recharging session of the method 220 is an extra-high-voltage recharging. The method 220 includes steps 222 to 266, as illustrated. The sequence of steps is shown as a representative example. Other step orders may be implemented to meet the criteria of a particular application.

In the step 222, the protection system 110 waits for the charging station 90 to signal a readiness for the first recharging session at the extra-high voltage. Once the charging station 90 is ready, the vehicle controller 122 commands the switching circuit 112 to close the charging switches 180a-180b, and commands the charging station 90 to begin recharging in the step 224. The vehicle 100 receives the first recharging current Ic1 in the step 226.

In the step 228, the protection controller 114 measures one or both measured voltages Vp and/or Vn between the input node(s) 142/144 and the floating chassis ground 146 of the high-voltage component 140 during the first recharging session. A check is performed by the protection controller 114 at the step 230 to determine if an improper (excessive) voltage is detected. If no improper voltage is detected, the timer 174 is not advanced (e.g., the counting is stopped) and continuation of the recharging is checked in the step 232. If the recharging should continue, the method 220 loops back to the step 228 to continue monitoring the measure voltages Vp and/or Vn.

If the first recharging session should be ended per the step 232, the vehicle controller 122 may signal the station controller 92 to end the first charging session in the step 234. The protection controller 114 commands the switching circuit in the step 236 to place the battery packs 130a-130n in the parallel arrangement and open the recharging switches

180a-180b. Thereafter, the charging station 90 may be disconnected from the vehicle in the step 238 and the method 220 ends.

Upon detection of an improper voltage at the step 230, the protection controller 114 may advance the timer 174 in the step 240 while the measured voltages Vp and/or Vn indicate the presence of the improper voltage between the input node(s) 142/144 and the floating chassis ground 146 of the high-voltage component 140. If the improper voltage is sensed for less time than the exposure threshold per the step 242, the method 220 returns to the step 228 and continues to monitor the input voltages Vp and/or Vn. A threshold for the exposure time may be determined by short-term overvoltage capabilities of high-voltage components 140 that are commonly used among electrification programs.

In response to the improper voltage being sensed for greater than exposure time in the step 242, the protection controller 114 signals the vehicle controller 122 to instruct the station controller 92 to cancel the first recharging session in the step 244. The protection controller 114 disables the series arrangement of the battery packs 130a-130n in the step 246 in response to the cancellation of the first recharging session due to the improper voltage. The protection controller 114 also commands the switching circuit 112 in the step 248 to rearrange the battery packs 130a-130n from the series arrangement to the parallel arrangement and open the recharging switches 180a-180b after the first recharging session has been cancelled.

Another time check is performed by the protection controller 114 in the step 250. If the high-voltage component 140 has been subjected to improper voltages for greater that a cumulative time, the protection controller 114 prohibits the series arrangement in the step 252. (The battery packs 130a-130n were previously configured in the parallel arrangement in the step 248.) The protection controller 114 waits in the step 254 to receive the notification through the maintenance port 116 that the appropriate repairs have been completed. While no notification is received, the protection controller 114 and the switching circuit 112 maintain the battery packs 130a-130n in the parallel arrangement in the step 256. Once the notification is received, the protection controller 114 enables the series arrangement in the step 258. The method 220 subsequently ends in the step 260.

Where the cumulative time limit has not been reached in the step 250, the sensor 118 measures a distance and/or top speed that the vehicle 100 has traveled (or moved) since the first recharging session was cancelled due to the improper voltage in the step 262. If the distance/speed traveled is less than a threshold distance/threshold speed per the step 254, the protection controller 114 and the switching circuit 112 maintain the battery packs 130a-130n in the parallel arrangement in the step 266 and the method 220 returns to the step 262 to continue measuring the distance traveled. After the distance/speed traveled is greater than the threshold distance/threshold speed per the step 264, the protection controller 114 enables the series arrangement in the step 258 and the method 220 ends in the step 260.

The function of disabling the extra-high-voltage recharge may encourage the driver to move the vehicle 100 away from a potentially bad charging station 90. The driver should be informed that the extra-high-voltage recharging function is re-enabled after the vehicle speed is over a threshold speed and/or the vehicle location has moved over a certain distance. Having the vehicle 100 drive away from a potentially bad charging station 90 may reduce the occurrence rate of the high-voltage component 140 experiencing the improper voltages. The function of automatically enabling the high-voltage recharging in response to the extra-high-voltage recharging being disabled and/or prohibited generally provides a convenience to the driver.

Figure 10:
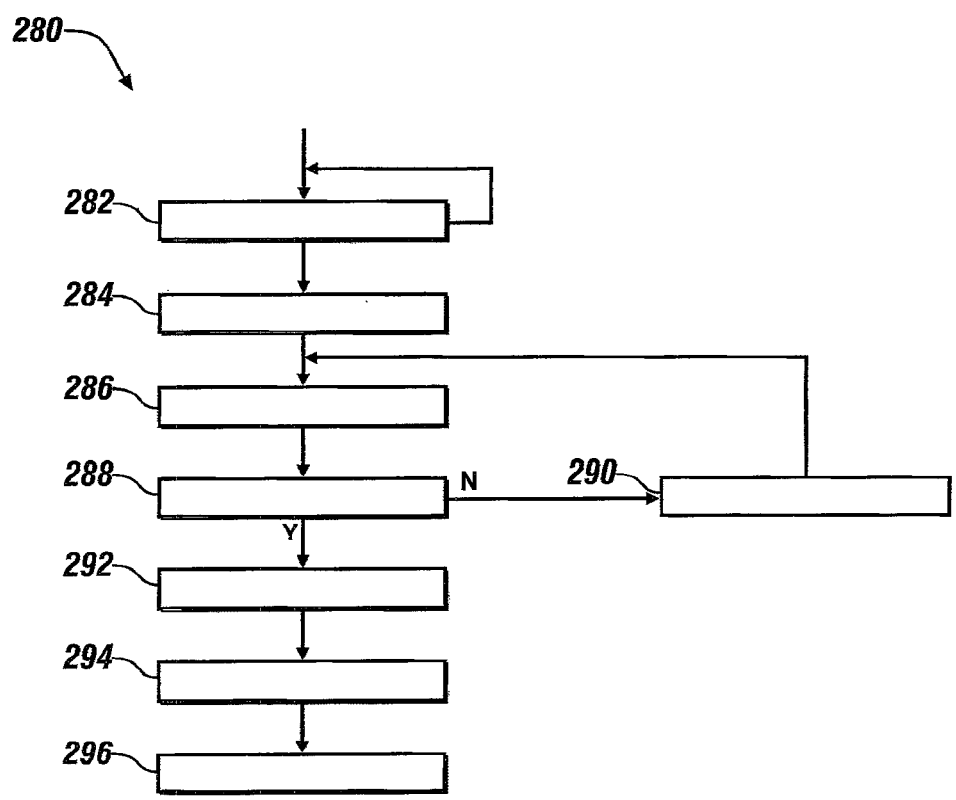
FIG. 10 is a flow diagram of a method for a second recharging session in accordance with one or more exemplary embodiments.

Referring to FIG. 10, a flow diagram of an example implementation of a method 280 for a second recharging session is shown in accordance with one or more exemplary embodiments. The method (or process) 280 may be implemented by the system 80. The second recharging session of the method 280 is a high-voltage recharging. The method 280 includes steps 282 to 296, as illustrated. The sequence of steps is shown as a representative example. Other step orders may be implemented to meet the criteria of a particular application.

In the step 282, the protection system 110 waits for the charging station 90 to signal a readiness for the second recharging session at the high voltage. Once the charging station 90 is ready, the vehicle controller 122 commands the switching circuit 112 to close the recharging switches 180a-180b, and commands the charging station 90 to begin recharging in the step 284. The vehicle 100 receives the second recharging current Ic2 in the step 286. The second recharging current Ic2 may be a variation of the recharging current Ic (FIG. 1).

A check may be performed in the step 288 to determine if the second recharging session should continue. If the conclusion is to continue charging per the step 290, the method 280 may return to the step 286 and the vehicle 100 continues to receive the second recharge current Ic2. If the second recharging session should end, the vehicle controller 122 may signal the station controller 92 to end the second charging session in the step 292. The protection controller 114 and the switching circuit 112 maintain the battery packs 130a-130n in the parallel arrangement per the step 294 and open the recharging switches 180a-180b. Thereafter, the charging station 90 may be disconnected from the vehicle in the step 296 and the method 280 ends.

Various embodiments sense different isolation faults, including loss of isolation and resistive short, by direct voltage sensing between high-voltage rails (or inputs) and a chassis ground of the high-voltage component 140. A delay between sensing excessive voltages and taking protective action enables full utilization of short-term overvoltage capabilities of the high-voltage component 140 to save cost, weight, and size. The direct voltage sensing does not rely on accurately measuring the isolation resistance of the connected electrical systems, nor measuring noisy ground fault currents to trigger the protection.

Embodiments of the system 80 generally provides machines and/or methods for protection of high-voltage components 140 from isolation faults during extra-high-voltage recharging. The protection generally includes changing a variable arrangement of the battery packs 130a-130n from the parallel arrangement to the series arrangement in preparation for the first recharging session, and transferring electrical power from the battery packs 130a-130 to the high-voltage component 140 in both arrangements. Once the charging station 90 is ready, a first flow of the first recharging current Ic1 in the first recharging session from the charging station 90 to the vehicle 100 is commanded, and the measured voltage(s) Vp and/or Vn between the input nodes 142/144 and the floating chassis ground 146 of the high-voltage component 140 are measured during the first recharging session. The protection controller 114 advances the timer 174 while the measured voltages Vp/Vn indicate the presence of an improper voltage between the input nodes 142/144 and the floating chassis ground 146. The first recharging session is canceled in response to the presence of the improper voltage at the high-voltage component 140 for greater than an exposure time, and the battery packs 130a-130n are rearranged from the series arrangement to the parallel arrangement after the first recharging session has been cancelled.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

While the best modes for carrying out the disclosure have been described in detail, those familiar with the art to which this disclosure relates will recognize various alternative designs and embodiments for practicing the disclosure within the scope of the appended claims.

What is claimed is:

1. A protection system for a high-voltage component comprising:
    a switching circuit couplable to a plurality of battery packs and the high-voltage component, and configured to:
        change a variable arrangement of the plurality of battery packs between a parallel arrangement and a series arrangement; and
        transfer power from the plurality of battery packs to the high-voltage component, wherein each of the plurality of battery packs operates at a battery voltage, the high-voltage component operates at the battery voltage, and the high-voltage component includes an input node and a floating chassis ground; and
    a protection controller coupled to the switching circuit and the high-voltage component, and configured to:
        command the switching circuit into the series arrangement in response to a first recharging session;
        command a first flow of a first current in the first recharging session;
        measure a first voltage between the input node and the floating chassis ground of the high-voltage component during the first recharging session;
        advance a timer while the first voltage indicates a presence of an improper voltage between the input node and the floating chassis ground; and
        cancel the first recharging session in response to the presence of the improper voltage for greater than an exposure time, wherein the first recharging session provides a first direct-current fast-charging voltage to the plurality of battery packs in the series arrangement, and the first direct-current fast-charging voltage is greater than the battery voltage.

2. The protection system according to claim 1, wherein the protection controller is further configured to:
    command the switching circuit into the parallel arrangement after the first charging session has been cancelled; and
    maintain the parallel arrangement of the plurality of battery packs while the protection system has been moved less than a threshold distance since the first recharging session was cancelled due to the improper voltage.

3. The protection system according to claim 2, wherein the protection controller is further configured to enable the series arrangement of the plurality of battery packs in response to the protection system being moved greater than the threshold distance since the first recharging session was cancelled due to the improper voltage.

4. The protection system according to claim 3, wherein the protection controller is further configured to command a flow of current in a second recharging session while the plurality of battery packs are in the parallel arrangement, the second recharging session provides a second direct-current fast-charging voltage to the plurality of battery packs in the parallel arrangement, and the second direct-current fast-charging voltage approximately matches the battery voltage.

5. The protection system according to claim 1, wherein the protection controller is further configured to prohibit the series arrangement of the plurality of battery packs in response to the timer exceeding a cumulative time.

6. The protection system according to claim 5, further comprising a maintenance port coupled to the protection controller and configured to receive a notice that service has been performed on the high-voltage component, wherein the protection controller is further configured to enable the series arrangement of the plurality of battery packs in response to the notice.

7. The protection system according to claim 5, wherein the cumulative time is approximately 600 seconds, and the exposure time is approximately 5 seconds.

8. The protection system according to claim 1, wherein:
    the input node of the high-voltage component includes a positive input node and a negative input node;
    the first voltage includes a positive first voltage between the positive input node and the floating chassis ground, and a negative first voltage between the negative input node and the floating chassis ground; and
    the presence of the improper voltage is determined by the protection controller based on one or more of the positive first voltage and the negative first voltage.

9. The protection system according to claim 1, wherein the battery voltage is approximately 400 volts, and the first direct-current fast-charging voltage is approximately 800 volts.

10. A method for fault detection while recharging a vehicle comprising:
    changing a variable arrangement of a plurality of battery packs of the vehicle from a parallel arrangement to a series arrangement in response to a first recharging session, wherein each one of the plurality of battery packs operates at a battery voltage;
    transferring power from the plurality of battery packs to a high-voltage component of the vehicle, wherein the high-voltage component operates at the battery voltage, and includes an input node and a floating chassis ground;
    commanding a first flow of a first current in the first recharging session with a protection controller of the vehicle, wherein the first recharging session provides a first direct-current fast-charging voltage to the plurality of battery packs in the series arrangement, and the first direct-current fast-charging voltage is greater than the battery voltage;
    measuring a first voltage between the input node and the floating chassis ground of the high-voltage component during the first recharging session;

advancing a timer while the first voltage indicates a presence of an improper voltage between the input node and the floating chassis ground of the high-voltage component; and cancelling the first recharging session in response to the presence of the improper voltage at the high-voltage component for greater than an exposure time.

11. The method according to claim 10, further comprising:

maintaining the parallel arrangement of the plurality of battery packs while the vehicle has been driven less than a threshold distance since the first recharging session was cancelled due to the improper voltage.

12. The method according to claim 11, further comprising:

enabling the series arrangement of the plurality of battery packs in response to the vehicle being driven greater than the threshold distance since the first recharging session was cancelled due to the improper voltage.

13. The method according to claim 12, further comprising:

commanding a second flow of a second current in a second recharging session while the plurality of battery packs are in the parallel arrangement, wherein the second recharging session provides a second direct-current fast-charging voltage to the plurality of battery packs in the parallel arrangement, and the second direct-current fast-charging voltage approximately matches the battery voltage.

14. The method according to claim 10, further comprising:

prohibiting the series arrangement of the plurality of battery packs in response to the timer exceeding a cumulative time.

15. The method according to claim 14, further comprising:

enabling the series arrangement of the plurality of battery packs in response to a notice that service has been performed on the vehicle.

16. The method according to claim 14, wherein the cumulative time is approximately 600 seconds, and the exposure time is approximately 5 seconds.

17. A vehicle comprising:

a plurality of battery packs, each operating at a battery voltage;

a high-voltage component having an input node and a floating chassis ground, and operating at the battery voltage;

a switching circuit coupled to the plurality of battery packs and the high-voltage component, couplable to a charging station, and configured to:

change a variable arrangement of the plurality of battery packs between a parallel arrangement and a series arrangement; and transfer power from the plurality of battery packs to the high-voltage component; and a protection controller coupled to the switching circuit and the high-voltage component, couplable to the charging station, and configured to:

command the switching circuit into the series arrangement in response to a recharging session;

command a flow of a current from the charging station in the recharging session;

measure a first voltage between the input node and the floating chassis ground of the high-voltage component during the recharging session;

advance a timer while the first voltage indicates a presence of an improper voltage between the input node and the floating chassis ground of the high-voltage component; and cancel the recharging session in response to the presence of the improper voltage from greater than an exposure time.

18. The vehicle according to claim 17, wherein:

the input node of the high-voltage component includes a positive input node and a negative input node;

the first voltage includes a positive first voltage between the positive input node and the floating chassis ground, and a negative first voltage between the negative input node and the floating chassis ground; and the presence of the improper voltage is based on one or more of the positive first voltage and the negative first voltage.

19. The vehicle according to claim 17, further comprising:

a sensor configured to measure a speed of the vehicle; and wherein the protection controller is further configured to:

disable the series arrangement of the plurality of battery packs in response to the speed being less than a threshold speed since the recharging session was cancelled due to the improper voltage; and enable the series arrangement of the plurality of battery packs in response to the speed being greater than the threshold speed since the recharging session was cancelled due to the improper voltage.

20. The vehicle according to claim 17, wherein the protection controller is further configured to:

prohibit the series arrangement of the plurality of battery packs in response to the timer exceeding a cumulative time; and enable the series arrangement of the plurality of battery packs in response to a notice that service has been performed on the vehicle.

* * * * *